April 2, 1935.   V. BENDIX   1,996,271
BRAKE
Original Filed Jan. 8, 1927
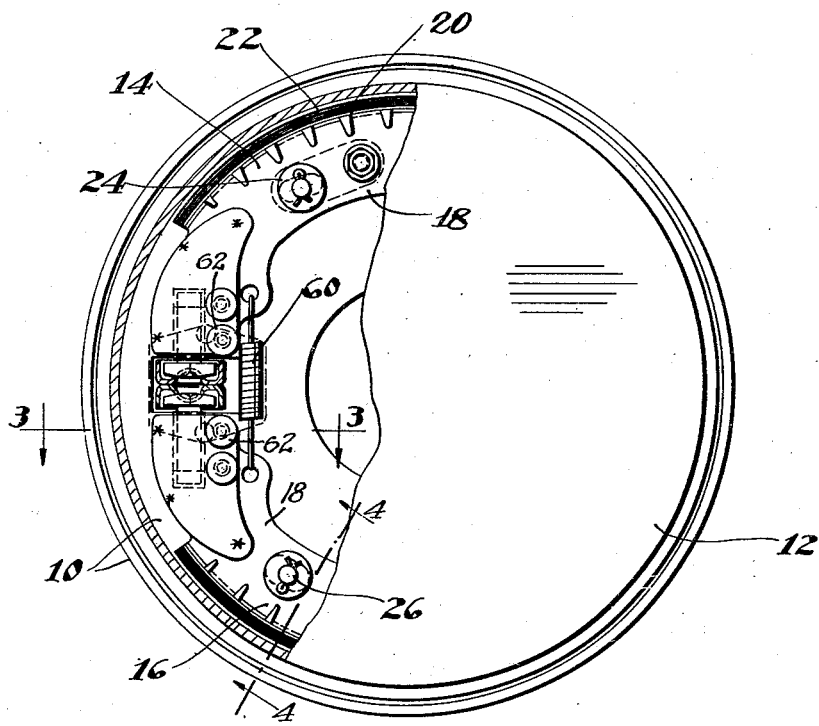
FIG. 1
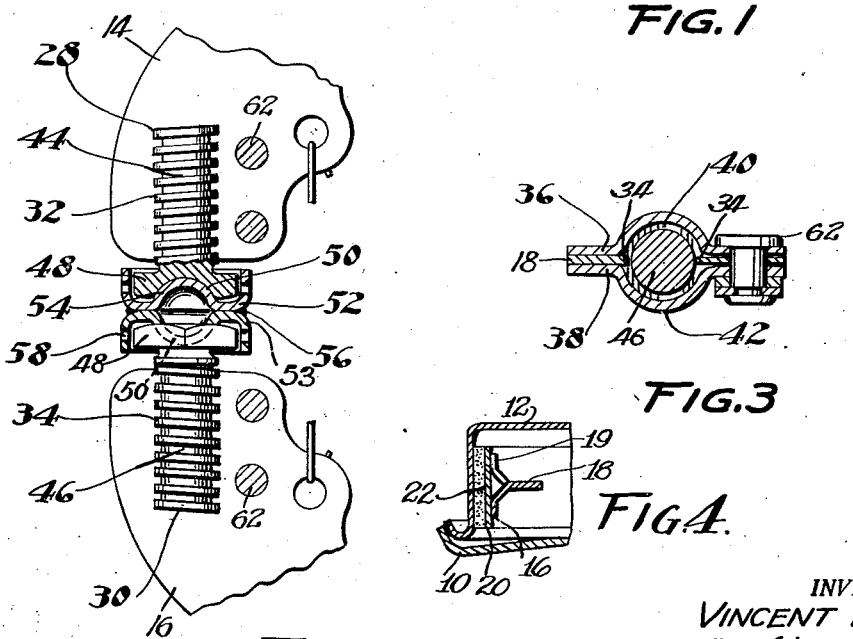
FIG. 2
FIG. 3
FIG. 4
INVENTOR.
VINCENT BENDIX
BY O. H. Fowler
ATTORNEY Patented Apr. 2, 1935

1,996,271

UNITED STATES PATENT OFFICE 1,996,271

BRAKE

Vincent Bendix, Chicago, Ill., assignor to Bendix Brake Company, South Bend, Ind., a corporation of Illinois Original application January 8, 1927, Serial No. 159,806. Divided and this application March 9, 1931, Serial No. 521,112. Renewed August 13, 1934

30 Claims. (Cl. 188—79.5)

This invention relates to brakes and more particularly to adjusting means for the friction elements thereof.

The present application is a division of my pending application Serial No. 159,806, filed January the 8th, 1927, and is made under the requirements of the United States Patent Office, under provision of rule 42.

Broadly, the invention comprehends means for adjusting the friction elements of a brake to compensate for wear.

An object of the invention is to provide means connected between the articulated ends of the friction elements for adjusting the overall length of the friction elements.

Another object of the invention is to provide an adjusting connection between the articulated ends of the friction elements which provide for circumferential, radial and pivotal movements of these elements.

A further object of the invention is to provide an adjustable connection for friction elements, which is simple in structure, easily and quickly applied, and will efficiently perform its intended function.

Other objects of the invention will appear from the following description taken in connection with the drawing, which forms a part of this specification, and in which:

Figure 1 is a side elevation of a brake partly broken away and partly in section, illustrating the invention as applied;

Figure 2 is an enlarged detailed view, illustrating the adjustable connection;

Figure 3 is a section substantially on line 3—3 of Figure 1; and

Figure 4 is a partial section on the line 4—4 of Figure 1.

Referring to the drawing for more specific details of the invention, 10 represents a fixed support such as a backing plate having associated therewith a rotatable drum 12 which may be secured to a wheel, not shown. Positioned for movement on the backing plate are friction elements or built-up stamped steel shoes 14 and 16. Each of the shoes comprises a web 18 having integral tongues 19 bent alternately in opposite directions and supporting and welded to a rim 20 to which is suitably secured a liner 22 adaptable for cooperation with the braking surface of the drum.

The shoes are secured on the backing plate against lateral movement by suitable steady rests 24 and 26 and are adapted to be spread into engagement with the braking surface of the drum by any suitable means, such as a cam or other brake applying device, not shown.

The webs of the shoes are longitudinally slotted as indicated at 28 and 30, and those portions of the webs defining the slots 28 and 30 are provided with teeth 32 and 34. Secured preferably by spot-welding on the sides of the webs are reinforcing plates or steel stampings 36 and 38 provided with registering semi-cylindrical portions or grooves or depressions 40 and 42 straddling the slots 28 and 30. The cylindrical portions 40 and 42 provide cylinders or sockets for the reception of screws 44 and 46, having respectively right and left threads, and mounted for travel in the cylinders with their threads engaging the teeth 32 and 34, the screws being provided with enlarged heads 48 having recesses 50.

The stampings 36 and 38 are free and spaced slightly from opposite sides of the web of the shoe, along their inner sides at the ends of the shoe, and are held sprung toward each other under fixed tension by means such as a rivet or other fastening 62, thus frictionally gripping the threaded shank of screw 44 or 46 between them and preventing unintentional shifting thereof.

As pointed out above, the patches or stampings 36 and 38, which are spot-welded as shown to the opposite sides of the shoe webs, are formed to embrace the stems of the adjusting members 44 and 46. At the side opposite the spot-welds there are a pair of fastenings 62 serving to hold the stampings 36 and 38 clamped, under fixed tension, against the opposite sides of the adjusting members 44 and 46, thus holding them frictionally against unintended movement.

Two corresponding stampings 52 are positioned between the heads of the screws 44 and 46. Each of the stampings comprises a cap having a flange or skirt 53 adapted to slip over the head of the screw with a substantial clearance and swedged in the top of the cap is a semi-spherical portion 54 adapted to seat in the recess 50 in the heads of the screws. The flanges 53 serve as a loose connection between the heads of the screws, forcing them to turn together in adjusting the brake, but permitting a slight independent rocking motion. The caps are suitably welded together as indicated at 56 and are provided with diametral recesses or openings 58 for the reception of an adjusting wrench or tool by which the caps may be rotated. The semi-spherical portions 54 of the stampings 52 jointly form a ball or thrust member or pivot between the heads 48, and with respect to which said heads can turn slightly, thereby forming a pivot connection between the shoes.

The heads 48 on the screws and the skirt of the caps 52 are polygonal; hence movement of one affects the other, and the caps 52 are retained in position on the screw heads 48 by a coil spring 60 connecting the ends of the shoes.

Although this invention has been described in connection with certain specific embodiments, the principles involved are susceptible of numerous other applications that will readily occur to persons skilled in the art. The invention is, therefore, to be limited only as indicated by the scope of the appended claims. The present application is junior in date of invention to application No. 499,683, filed December 3, 1930.

Having thus described the various features of the invention, what I claim as new and desire to secure by Letters Patent is:

1. An adjusting device comprising right and left threaded screws and a rounded member between the screws and forming a pivotal thrust connection therebetween.

2. An adjusting device comprising right and left threaded screws, heads on the screws having sockets, means in the sockets providing a pivotal connection between the screws.

3. An adjusting device comprising right and left threaded screws, heads on the screws having registering sockets and means sleeved on the heads of the screws providing pivotal connection between the screws.

4. An adjusting device comprising right and left threaded screws, enlarged heads on the screws having registering sockets, and means engaging the periphery of the heads of the screws and having a pivot portion seated in the sockets.

5. An adjusting device comprising right and left threaded screws, enlarged heads on the screws having registering sockets, cap members arranged top to top having registering swedged portions providing a spherical member seated in the registering sockets and means for securing the cap members together.

6. A brake comprising friction elements, right and left threaded screws engaging the elements, enlarged heads on the screws having semi-spherical recesses, and a part having spherical portions seated in the recesses, and having means for being retained against displacement angularly without preventing it from moving with the friction elements in the direction of their length.

7. A brake comprising a shoe having a web with a slot extending entirely therethrough, and teeth on the walls defining the slot.

8. A brake comprising a shoe having a slot, teeth extending into the slot and semi-cylindrical members straddling the slot.

9. A brake comprising a shoe having a longitudinal slot, teeth on the walls defining the slot and registering semi-cylindrical members on the shoe straddling the slot and teeth.

10. A brake comprising shoes having webs having slots extending therethrough, teeth on the webs extending into the slots, screws positioned in the slots having threads engaging the teeth on the webs, and pivotal means connecting the screws.

11. A brake comprising a shoe including a web having a longitudinal slot, teeth on the web extending into the slot, reinforcing plates on the sides of the web, semi-cylindrical portions on the reinforcing plates straddling the slot and the teeth and providing a cylinder, an adjusting screw positioned for travel in the cylinder having threads thereon engaging the teeth on the web.

12. A brake comprising shoes having webs provided with slots, teeth on the webs extending into the slots, reinforcing plates on the webs having registering semi-cylindrical portions straddling the slots and the teeth, right and left threaded screws retained in the slots by the semi-cylindrical portions with the threads on the screws engaging the teeth and means pivotally connecting the screws, including members sleeved on the heads of the screws and provided with pivot means adapted to engage the heads of the screws.

13. A brake shoe comprising a stiffening web formed with teeth cut entirely therethrough, a thrust member having a stem in adjustable threaded engagement with the teeth and means for holding the thrust member in engagement with the teeth.

14. A brake shoe comprising a stiffening web formed with teeth cut entirely therethrough, a thrust member having a stem in adjustable threaded engagement with the teeth and parts secured to opposite sides of the web supporting the thrust member.

15. A brake comprising a pair of shoes having at their adjacent ends adjustable thrust members and a member having spherical portions confined between and free to float with the thrust members serving as a pivot between the shoes.

16. A brake shoe having a stiffening web formed with teeth cut therein and having means to hold in place an adjusting member threaded into said teeth.

17. A brake shoe having a stiffening web with a slot formed on its edges with teeth cut in said web and having means to hold in place an adjusting member engaging said teeth.

18. A brake shoe having a web with a slot extending into its end, and having parts secured to its sides and defining, between them and with said slot, a socket extending into the end of the shoe.

19. A brake shoe having a web with a slot extending into its end, and having semi-cylindrical registering parts secured to its sides in registry with said slot and defining, between them and with said slot, a generally-cylindrical socket extending into the end of the shoe.

20. A brake shoe having a web with a slot extending into its end, and having parts secured to its sides and defining, between them and with said slot, a socket extending into the end of the shoe, said shoe having means in said socket for adjustably engaging a thrust member received therein.

21. A brake shoe having an adjusting member threaded therein and having means under fixed tension frictionally engaging said member and holding it from turning.

22. A brake shoe having an adjusting member threaded therein and having parts secured to its sides and embracing said member between them and frictionally gripping said member and yieldingly holding it from turning.

23. A brake shoe having a thrust member adjustably mounted therein, and having a web provided with separately-formed parts secured thereto at opposite sides embracing said member between them, and means for holding said parts in engagement with the opposite sides of said member.

24. A brake adjustment comprising a pair of plates having registering longitudinally extending depressions forming a cylindrical aperture between said plates.

25. A brake comprising a shoe having a web having a slot in its end and provided with stampings secured to its sides and located at the end of the shoe to provide a socket in said end.

26. A brake comprising a shoe having a web having a slot in its end and provided with stampings arranged on opposite sides of the web and formed with registering depressions forming a generally-cylindrical socket.

27. A brake comprising a shoe having a web having a slot in its end and provided with stampings secured to its sides and formed with registering depressions jointly defining a socket between them.

28. A built-up stamped steel brake shoe having a web and having at the end of the web means including stampings secured to the web and formed with registering grooves and which means forms a cylindrical socket in its end formed by two stampings having registering semi-cylindrical grooves.

29. A brake comprising a shoe and an adjusting member therefor, the adjusting member including a screw, and the shoe comprising a web formed to receive said screw so arranged that the axis of the screw lies within the plane of the web, and a stamping formed with a depression and secured to one side of the web for maintaining the screw in said position.

30. A brake comprising a shoe and an adjusting member therefor, the adjusting member including a screw, and the shoe comprising a web formed to receive said screw, and means including a stamping formed with a depression and secured to one side of the web for maintaining the screw in said position.

VINCENT BENDIX.